Figure 1:
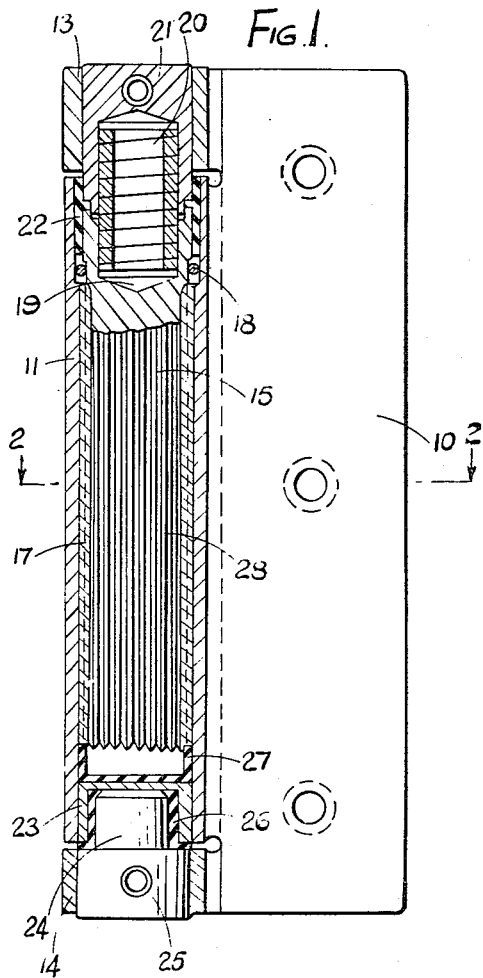

Jan. 21, 1964   J. N. MORRIS ETAL   3,118,167
DOOR CHECKING APPLIANCE
Filed Oct. 24, 1960   2 Sheets-Sheet 1

INVENTORS
JOHN NEVILLE MORRIS
RUTH MARGARET WILLIAMS

BY *[signature]*
ATTORNEYS

Jan. 21, 1964   J. N. MORRIS ETAL   3,118,167
DOOR CHECKING APPLIANCE
Filed Oct. 24, 1960   2 Sheets-Sheet 2
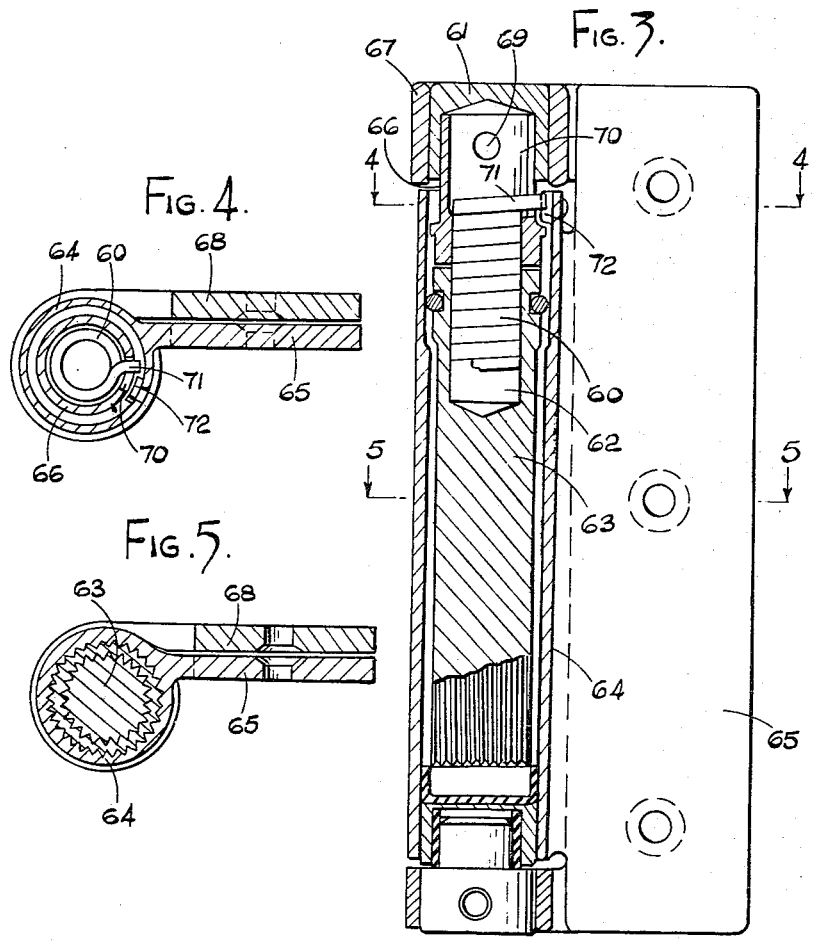
INVENTORS.
JOHN NEVILLE MORRIS
RUTH MARGARET WILLIAMS
BY
ATTORNEYS United States Patent Office
3,118,167
Patented Jan. 21, 1964

3,118,167
DOOR CHECKING APPLIANCE
John N. Morris, 38 Carpenter Road, Edgbaston, Birmingham, England, and Ruth Margaret Williams, 19 Oakley Gardens, London SW. 3, England
Filed Oct. 24, 1960, Ser. No. 64,499
Claims priority, application Great Britain Oct. 28, 1959
5 Claims. (Cl. 16—82)

This invention relates to an appliance for use in connection with doors and the like hinged members and the expression "door" as used herein, is intended to be taken in the generic sense so as to include, as well as conventional doors, other similar hinged panels and closure members. The invention relates to the type of appliance which includes a damping medium for exerting a force in opposition to the closing movement of a door.

According to the present invention we provide a door checking appliance of the type referred to comprising two relatively movable members one of which is connected to the door and the other being connected to the fixed structure to which the door is hinged in such manner that opening and closing movement of thte door produces relative rotary movement between the two members, one of said members having a hollow cylinder connected therewith and there being a rotor mounted co-axially within said cylinder which rotor is connected with the other member, there being an annular space between the rotor and the cylinder interior which is occupied by a damping fluid of relatively high viscosity and both the rotor and cylinder interior having portions projecting into said annular space, and a one-way clutch device operatively connected with one of said members and adapted to function so that in one direction of relative rotary motion between the two members, the clutch device is inoperative so as to permit the rotor and cylinder to rotate in unison through the physical connection of the damping fluid whilst in the other direction of relative rotary motion, the clutch is operative and causes relative rotary motion to take place between the rotor and the cylinder against the resistance of the damping fluid.

The invention is capable of being applied to a door hinge in such manner that the hinge includes the features of the invention.

Where the invention is applied to a hinge of the type which has two leaves, one connected to the door and the other connected to a fixed upright, the cylinder may be formed integrally with one of the leaves and the rotor may comprise a spindle rotatable within the cylinder, the one-way clutch device being connected operatively between this spindle and a hinge knuckle on the other leaf.

The damping fluid is preferably a putty-like substance having a relatively high viscosity and one particular substance, which is known as silicone putty (or bouncing putty), has particularly useful properties in relation to the present invention because this putty has the unique property that when subject to a sudden shock load, it ceases to behave as a viscous fluid or putty-like substance and shears abruptly. For application of moderate stress it behaves like a normal highly viscous fluid but under shock load it behaves like a fragile non-ductile solid. Thus, this characteristic limits the load which can be applied to the attachment points of a hinge or door closer if an attempt is made to over-ride violently the damping action such as a sudden severe load being applied to the door to hasten its rate of closing.

The hinge incorporating the invention may be used in conjunction with ordinary hinges relying upon gravitational effects for closing the door, or such hinge may be used in conjunction with any convenient form of door closing spring which might, for example, be incorporated in another hinge.

The one-way clutch device may take the generally known form of a coil spring which is adapted to be wound up or unwound according to the direction of rotation.

Figure 2:
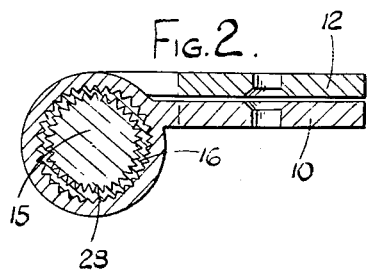

The invention is illustrated in the accompanying drawings wherein,

FIGURE 1 is a side elevation partly sectioned, of a door hinge embodying the features of the invention.
FIGURE 2 is a section on the line 2—2 in FIGURE 1.
FIGURE 3 is a view similar to FIGURE 1 of a modified form of hinge.
FIGURE 4 is a section on the line 4—4 of FIGURE 3.
FIGURE 5 is a section on the line 5—5 of FIGURE 3.

Referring to the door hinge shown in FIGURES 1 and 2, this hinge may be used in conjunction with another hinge of similar dimension incorporating a closing spring, or the hinge of FIGURE 1 may be used in conjunction with conventional hinges, the door being provided with a separate closure spring.

Referring to FIGURE 1, the main parts of the hinge comprise a leaf 10 which has the cylinder 11 formed integrally along its longitudinal edge and a second leaf 12 which is formed with hinge knuckles 13 and 14 at its upper and lower end respectively, it being assumed that in FIGURE 1 the hinge is shown in the upright position in which it would be used. Referring to FIGURE 2, the leaf 10 would be attached to the fixed upright or door jamb, the leaf 12 being attached to the edge of the door.

The cylinder 11 has disposed therein the rotor of the fluid damping device, and in this case the rotor takes the form of a spindle 15 extending co-axially within the bore of the cylinder 11, and it will be observed from FIGURE 2, that the interior of the cylinder 11 is formed with a series of grooves or serrations 16 which provide a number of portions projecting into the annular space between the spindle 15 and the interior of the cylinder 11. The spindle 15 is similarly provided with serrations 28. As an alternative to the serrations 16 and 28, the surfaces concerned may be knurled or otherwise deeply roughened.

The annular space between the bore of the cylinder 11 and the spindle 15 is filled with a putty-like substance such as silicone putty previously referred to and this fluid damping medium is indicated at 17 in FIGURE 1.

A suitable sealing ring 18 is provided in a counterbore near the upper end of cylinder 11 and at its end the spindle 15 is provided with an axially extending recess 19 in which is located one end of the coil spring 20 which forms the one-way clutch device, the other end of this coil spring being located inside the inverted cup-shaped member 21 which is fixed within the bore of the upper hinge knuckle 13. A suitable bearing sleeve, as indicated at 22, is provided in the counterbore of cylinder 11 and such bearing sleeves may conveniently be made of a synthetic resinous material, such as, nylon, for example. The lower end of cylinder 11 is closed by an inverted cup-shaped cap 23 which is mounted rotatably upon the boss 24 of member 25 which is fixed in the lower hinge knuckle 14. Also at the lower end, suitable bearing sleeves such as indicated at 26 and 27, may be provided in nylon or similar material.

The length of the close-coiled spring 20 is such that it engages within the recess 19 and the member 21 and the diameter of the coil is such that after assembly it exerts a slight outwards pressure upon these members.

In operation when the door is opened, the spring 20 being of appropriate "hand," is able to slip freely within either or both of the members 19 and 21, and thus no rotation is imparted to the spindle 15. When the spring is released the door performs a closing movement; the spring 20 will expand to grip the members 21 and 19 and thus rotate the spindle 15 so that the closing movement of the door will be against the resistance of the fluid damping medium in the cylinder 11.

The modification of FIGURES 3 to 5 provides means for relieving the damping effect just prior to final closure so that the door can more easily overcome any final resistance such as the presence of a latch or the like.

In the modification shown in FIGURES 3, 4 and 5, the hinge is substantially the same as shown in FIGURES 1 and 2 and as described above, the modification being in the disposition and formation of the coil spring indicated at 60 in the drawings and the inclusion of a further part in between the upper end of the coil spring 60 and the member indicated at 61.

The lower portion of the coil spring is seated in an axial bore 62 in the upper end of the rotor 63 which is disposed co-axially within the cylinder 64 formed on the one edge of one of the hinge leaves 65 as described in the previous construction and the further part, referred to above, comprises an intermediate sleeve 66 disposed above the upper end of the rotor 63 and having the upper portion of the coil spring 60 disposed co-axially within the lower portion of the bore of this intermediate sleeve 66.

Seated upon the upper end of this intermediate sleeve 66 is the cup-shaped member 61, and this is located within the hinge knuckle 67 which is formed on the edge of the other hinge leaf 68 and the three parts, namely, the intermediate sleeve 66, the cup-shaped member 61, and hinge knuckle 67, are secured together by suitable means such as, a dowel pin 69 passing diametrically therethrough.

The wall of the intermediate sleeve 66 is provided with a slot 70 on one side, of predetermined circumferential length, and the upper end of the coil spring has its free end 71 projecting through this slot and terminating a short distance away from the inner surface of the cylinder 64. The circumferentially measured width of the slot 70 is greater than the thickness of the free end 71 of the coil spring so that this end is capable of movement circumferentially relatively to the intermediate sleeve 66 through an angle determined by the width of the slot 70.

Fixed to the inner surface of the cylinder 64 in substantially the same general plane as the free end 71 of the coil spring 60 is an abutment member 72 which projects into the path of movement of the free end 71 of the coil spring, and this abutment member may conveniently be secured to the inner surface of the cylinder by riveting (as shown).

The various parts are arranged so that the resistance to slipping in the free-wheeling direction of the portion of the coil spring 60 within the rotor 63 is somewhat greater than its corresponding resistance to slipping within the bore of the intermediate sleeve 66. This arrangement may be achieved either by a slight difference in the diametral interference of the coil spring within the rotor and the intermediate sleeve, or by a substantial difference in length of engagement of the portions of the spring within these two members or by a combination of these methods.

The operation of the device is as follows.

Commencing from the position where the door is closed and assuming that the hinge leaf 68 connected to the intermediate sleeve is to remain stationary, then initial opening movement will result in clockwise rotation of the cylinder 64 attached to the other leaf 65, as viewed in FIGURES 4 and 5. With this movement, the rotor 63, owing to the viscous nature of the damping medium which separates it from the bore of the cylinder, will rotate to substantially the same extent also carrying with it the coil spring which will slip or free wheel within the bore of the intermediate sleeve 66.

After a predetermined amount of rotation which is determined by the circumferential length of the slot 70 in the intermediate sleeve, the projecting free end 71 of the coil spring will come into contact with one edge of the slot 70 formed in the intermediate sleeve and thereafter, further rotation of the coil spring about its axis is prevented, so that further opening movement of the door resulting in further rotation of the rotor will be accompanied by slipping or free wheeling of the spring in the bore 62 formed in the upper end of the rotor.

When the door is closing, which in this example may be brought about by a separate closure spring, an anti-clockwise torque is then applied to the cylinder 64 attached to the hinge leaf 65, and this torque is transmitted to the rotor 63 through the medium of the viscous damping fluid, but the rotor is now prevented from rotating in an anti-clockwise direction since the spring 60 will now grip within the bore of the rotor and within the bore of the intermediate sleeve so that the cylinder will rotate slowly and the door will close slowly under the restraining influence of the viscous damping fluid.

This will continue until the abutment member 72 on the inside of the cylinder comes into contact with the free end 71 of the coil spring projecting through the slot 70 in the intermediate sleeve, and when this occurs, further rotation in the direction of closing tends to wind up the coil spring which will therefore be able to slip in the bore in the intermediate sleeve so that for the final portion of the closing movement of the door there will be little or no restraint from the viscous damping fluid.

The extent of this final free closure movement can be predetermined by the positioning of the abutment member 72 on the inner surface of the cylinder in relation to the adjacent edge of the slot 70 formed in the intermediate sleeve.

In both the above described arrangements, the coil spring should be "handed" in accordance with whether the device is applied to a "right-hand" or a "left-hand" door.

What we claim then is:

1. A door checking appliance incorporated in a door hinge having two hinge leaves one of which is connected to the door and the other being connected to the fixed structure to which the door is hinged in such manner that opening and closing movement of the door produces relative rotary movement between the two leaves, wherein one of said leaves has a hollow cylinder connected therewith, a spindle mounted rotatably within said cylinder, there being an annular space between the spindle and the cylinder interior which is occupied by a damping fluid of relatively high viscosity and both the spindle and cylinder interior having portions projecting into said annular space, and a one-way clutch device operatively connected between said spindle and the other hinge leaf and adapted to function so that in one direction of relative rotary motion between the two hinge leaves, the clutch device is inoperative so as to permit the spindle and cylinder to rotate in unison through the physical connection of the damping fluid whilst in the other direction of relative rotary motion, the clutch is operative and causes relative rotary motion to take place between the spindle and the cylinder against the resistance of the damping fluid.

2. A door checking appliance incorporated in a door hinge according to claim 1 wherein the one-way clutch device comprises a close-coiled spring having frictional engagement with the spindle and with a hinge knuckle on said other leaf and arranged so that for one direction of rotation the spring slips relatively to either or both of these two parts and in the other direction of rotation the spring binds on these two parts so as to transmit rotation from one to the other.

3. A door checking appliance incorporated in a door hinge according to claim 1 wherein the interior of the cylinder and the exterior of the spindle are provided with axially extending grooves or serrations.

4. A door checking appliance according to claim 1 wherein means is provided for rendering the clutch device inoperative at a predetermined point during the closing movement of the door so that for the remainder of the closing movement there is no relative rotary motion between the spindle and the cylinder.

5. A door checking appliance according to claim 4 wherein one part of the close-coiled spring engages within a bore in one end of the spindle and the other part of the spring engages within the one end of a sleeve which is secured to a hinge knuckle on said other hinge leaf, the end of the spring which is within said sleeve being arranged to project through a slot formed in the wall of the sleeve, there being an abutment secured to the inside of the cylinder wall and disposed so that the end of the spring projecting through said slot is in the path of movement of the abutment when relative movement takes place between the cylinder and spindle during closing movement of the door.

References Cited in the file of this patent
UNITED STATES PATENTS

| | | |
|---|---|---|
| 2,490,258 | Diebel | Dec. 6, 1940 |
| 2,493,117 | Diebel | Jan. 3, 1950 |
| 2,590,185 | Land | Mar. 25, 1952 |
| 2,775,317 | Sinisterra | Dec. 25, 1956 |
| 2,818,883 | Hufferd | Jan. 7, 1958 |
| 2,890,477 | Miller | June 16, 1959 |